Nov. 9, 1954                  J. FROVA                  2,693,834
APPARATUS FOR DECLUSTERING AND DESTEMMING CHERRIES
Filed May 24, 1950
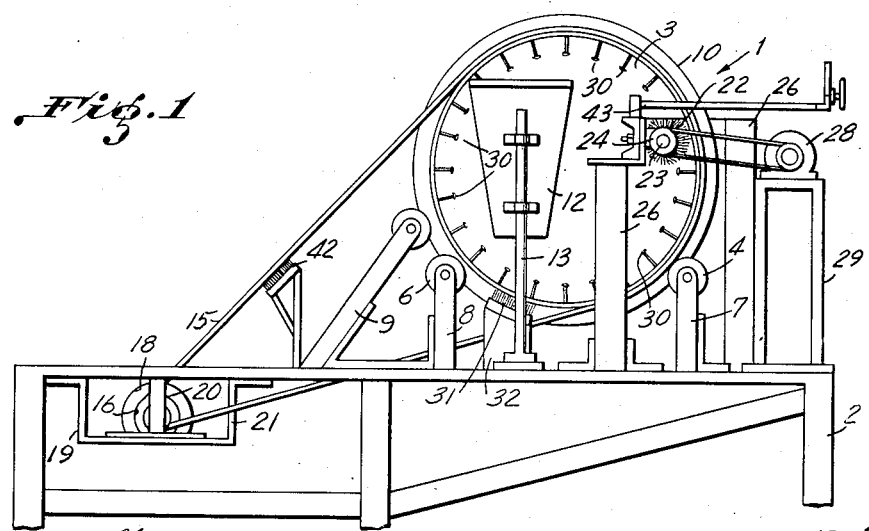
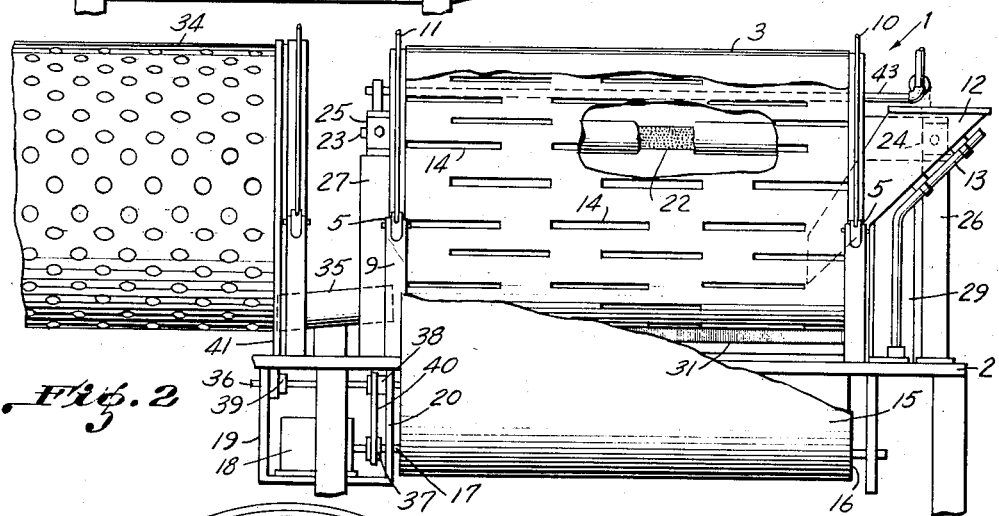
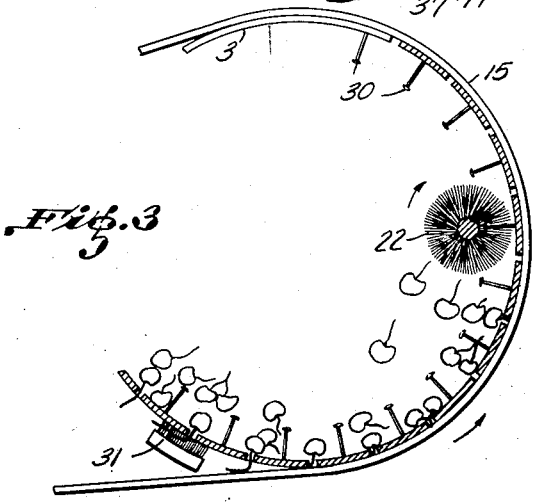
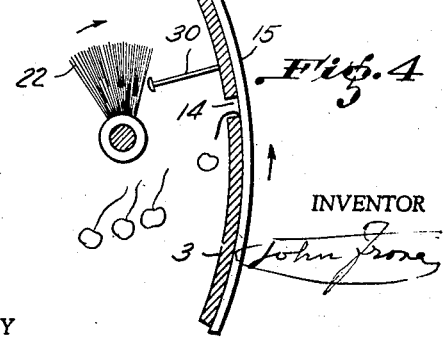
INVENTOR
BY
ATTORNEY

United States Patent Office 2,693,834
Patented Nov. 9, 1954

2,693,834

APPARATUS FOR DECLUSTERING AND DESTEMMING CHERRIES

John Frova, San Jose, Calif.

Application May 24, 1950, Serial No. 163,810

6 Claims. (Cl. 146—55)

This invention relates to apparatus for declustering, destemming and grading cherries.

The main object of my invention is to provide an efficiently combined apparatus capable of receiving cherries, with stems and in clusters, separating cherries in each cluster, destemming the cherries with or without clusters and grading the cherries in the same apparatus.

A further object is to have a compact apparatus very simple in form and mechanism which requires no attendants and occupies a minimum amount of floor space. While requiring a minimum outlay of funds for a maximum output of declustered, destemmed and graded fruits, it is also an object to provide apparatus of this character indicated which is so positive and effective in its operation that the fruit are not injured and the destemming operation is effected gently and rapidly, avoiding the tearing of the skin of the fruits.

An object also, is to provide the same device for declustering and destemming together or declustering alone and destemming alone.

In order to bring out the salient features of the invention in comprehensible manner and to the best advantage, the same is illustrated in the accompanying drawings, forming a part hereof.

Fig. 1 is an end elevation of the machine.

Fig. 2 is an enlarged side elevation of the machine embodying the invention in practical form.

Fig. 3 is an enlarged exhibition of the principal features of the apparatus illustrating the catching and separating of a cluster of cherries and the means to destem the fruits.

Fig. 4 applies to the same as Fig. 3.

Throughout the views, the same references indicate the same or like parts.

In the cherry handling art and particularly in apparatus for handling such cherries, certain operations have heretofore been carried out by hand while others have been effected by separate machines. This has entailed the repeated rehandling of the cherries at various stages, and the use of attendants and conveyor belts to deliver the fruit from one machine to another. The fruits conveyed by belts are liable to be injured. The elimination of conveyor belts is one of the most important advantages of my invention.

With the foregoing objects in view, it is now proposed to carry out in a combined machine, the entire group of operations as declustering, destemming and the grading of cherries.

Hence, referring now to the drawings in Figures 1 to 4, a fruit handling machine generally indicated at 1 has a main frame 2, and a drum 3 which is supported in an inclined position upon a group of grooved rollers 4, 5, 6, carried on supports 7, 8, 9, on the machine frame. The drum has spaced peripheral rails 10, 11, riding in the grooves of the rollers and thereby locating said drum in proper position while allowing the same to rotate on said rollers. At the higher end of the drum is located a hopper 12 supported closely adjacent to said end of the drum by a bracket 13 secured on the machine frame. The drum is perforated with preferably longitudinal apertures 14 small enough not to allow the cherries to go through. The drum 3 is rotated at a relatively low speed by an endless belt 15, having a width approximately as wide as the length of the drum, the belt connecting the drum with a pulley 16 that is fixed on the driving shaft 17 of a motor 18. The motor is supported by brackets 19, 20 and 21 secured on the frame, said motor and pulley being placed below the level of the drum. A soft cylindrical brush 22 (horsehair, nylon, etc.) is mounted so as to be tangent to the inner surface of the drum. The bristles of the brush extend radially from a shaft 23 disposed longitudinally inside the drum; said shaft rotating in bearings 24 and 25 that in turn are supported by brackets 26 and 27 fixed on the frame. The rotation of said shaft 23 is at a relatively high speed in the opposite direction to the rotation of the drum, and the shaft is driven by a motor 28 fixed on a support 29, said shaft with its brush being positioned at a certain height inside the drum and on the side where the drum, in its rotation, is moving upwardly, see Figure 3.

In order to catch the clusters of cherries fed into the bottom of the drum through the hopper 12, a group of rigid arms 30 extend radially inwardly from the interior of the drum and are distributed along the inner wall of the drum. These arms serve to pick up in the bottom of the drum individual clusters of cherries and bring the same upward into contact with the rotating brush. The stems of the cherries, being normally more securely attached to the fruit than to the other stems of the clusters, are separated from the clusters by the high speed of the brush when the brush comes into contact with the cherries, said declustered cherries with stems intact returning by gravity to the bottom of the drum and will gradually feed down along the drum due to the rotation of the latter and the slight inclination of the same. During said travel, the stems of the cherries will project into the bottom of the drum through the apertures 14 of the drum where the belt 15 is not in contact with the outside wall of the drum.

Outside the drum and specifically just before the belt 15 comes into contact therewith, a supplementary brush 31 is disposed under the drum and extends longitudinally and tangently thereof. The brush 31 contacts with the outside wall of the drum and is fixed on a support 32 on the frame, and compels the stems to project more outwardly, positioning said stems parallel to the outer surface of the drum to facilitate the clamping of the stems when the belt enters into contact with the outer wall of the drum. During the rotation of the drum, the clamped stems and consequently the cherries are carried up to the point where the brush 22 rotates in contact with the inside wall of the drum. Since the stems are fastened very well between the belt and the outer surface of the drum, the opposite rotation and the high speed of the rotation of the soft brush 22 causes the cherries to free themselves from their stems. The fruit thus destemmed, falls into the bottom of the drum and gradually travels down along the drum interior due to the rotation of the latter and the slight inclination of the same. The destemmed cherries are discharged from the lower end of the drum into another drum 34, or into a prolongation of the first drum 3, to be graded.

Said grading drum 34 can be directly connected with the declustering and destemming drum forming a unit therewith and supported by the same frame and receiving the discharged cherries from the first drum through an inclined channel 35 or other conveying means.

As grading drums for various purposes are well known, it will suffice to mention that the grader drum 34 can be divided into sections, the first section having small holes or apertures and the succeeding sections increasingly larger, etc. The grading drum 34 described forms a unit with the first drum. It is supported in an inclined position upon a group of grooved rollers which in turn are supported on the same frame as supports the first drum. The grading drum 34 may be rotated by another motor or by means interconnecting the first and the second drums together. For example, a second driving shaft 36 is operatively connected with the first driving shaft by pulleys 37, 38 and 39, and belts 40 and 41. The belt 41 is small and is used as driving belt around the second drum. When the grading drum 34 is a prolongation of the destemming and declustering drum 3, the brush 22 will only be carried on the support 26 which can be strengthened and the support 27 can be abolished. The fruits not in cluster follow the same operation as the already declustered cherries and are destemmed in the same way. To remove the stems which may stay attached to the inner surface of the belt, a supplementary brush 42 can be used and applied to the undersurface of the belt after it leaves the drum.

To obtain the declustering of the fruits without the destemming operation, especially for cocktail cherries which are to be graded with stems, it is only necessary to substitute the big driving belt 15 with another small belt as the belt 41 of the grading drum that will not cover the apertures 14.

While variations may be resorted to and parts may be used without others or be replaced by others of modified form, it is quite evident that the operation will be continuous and wholly automatic throughout.

From the foregoing, it is clear that a group of operations are performed by the machine without necessarily including any hand labor or conveyors but rather all operations succeed each other rapidly and automatically in order that a constant supply of clusters of cherries, or cherries with stems or without stems through the hopper 12 will produce a big supply of declustered, destemmed and graded or declustered and graded cherries.

The described machine has great potentiality of production reducing the cost of the final product.

Water jets 43 can be used to smooth the destemming and declustering operations.

Having now fully described my invention, I claim:

1. In a device of the type described: a hollow perforated drum having a plurality of inwardly extending cherry stem cluster engaging arms; means for rotating the drum about an axis inclined downwardly slightly from the horizontal, a belt contacting a part of the perforated portion of the outer surface of the drum from a point near the underside of the drum to a point peripherally spaced above the bottom of the drum; means for delivering unstemmed cherries and clusters of cherries into the drum interior where the arms will engage with cherry clusters and lift them as the drum rotates; a brush mounted within the drum and contacting that portion of the drum interior that is lifting the cherry clusters; and means for rotating the brush in a direction opposite to the rotation of the drum; whereby the brush will strike the cherry bodies and will break up the cherry clusters being lifted by the arms; the declustered cherries falling to the drum bottom and the stems of the declustered cherries passing into and extending through the slots of the drum unobstructed by the belt; the stems of the cherries extending through the drum slots adapted to be gripped between the belt and the adjacent outer surface of the drum; the said brush being located opposite the portion of the drum upon which the belt is in contact; whereby the rotating brush will again contact with the cherry bodies to separate the cherries from the belt gripped stems.

2. In a device of the type described: a hollow perforated drum; means for rotating the drum about an axis inclined downwardly slightly from the horizontal, a belt contacting a part of the perforated portion of the outer surface of the drum from a point near the underside of the drum to a point peripherally spaced above the bottom of the drum; means for delivering unstemmed cherries into the drum interior where the stems of the cherries at the lower portion of the drum will pass into and extend through the drum slots unobstructed by the belt; the stem of the cherries extending through the drum slots adapted to be gripped between the belt and the adjacent outer surface of the drum; a brush mounted within the drum and contacting that portion of the drum interior that is lifting the cherries due to their stems being clamped to the drum by the belt; the said brush being located opposite the portion of the drum upon which the belt is in contact; means for rotating the brush in a direction opposite to the rotation of the drum for contacting with the cherry bodies and separating the cherries from the clamped stems, a brush for cleaning the surface of the belt that has been contacting the drum, for removing any stems that might adhere thereto, and a third brush contacting with the outer surface of the underside of the drum at a point just prior to that at which the belt contacts the drum, whereby any stems extending to the outer drum surface will be moved into a position against the drum exterior to be gripped by the belt.

3. In a device of the type described: a hollow perforated drum; means for rotating the drum about an axis inclined downwardly slightly from the horizontal, a belt contacting a part of the perforated portion of the outer surface of the drum from a point near the underside of the drum to a point peripherally spaced above the bottom of the drum; means for delivering unstemmed cherries into the drum interior where the stems of the cherries at the lower portion of the drum will pass into and extend through the drum slots unobstructed by the belt; the stems of the cherries extending through the drum slots adapted to be gripped between the belt and the adjacent outer surface of the drum; a brush mounted within the drum and contacting that portion of the drum interior that is lifting the cherries due to their stems being clamped to the drum by the belt; the said brush being located opposite the portion of the drum upon which the belt is in contact; means for rotating the brush in a direction opposite to the rotation of the drum for contacting with the cherry bodies and separating the cherries from the clamped stems, and a brush contacting with the outer surface of the underside of the drum at a point just prior to that at which the belt contacts the drum, whereby any stems extending to the outer drum surface will be moved into a position against the drum exterior to be gripped by the belt.

4. In a device of the type described: a hollow perforated drum having a plurality of inwardly extending cherry stem cluster engaging arms; means for rotating the drum about an axis inclined downwardly slightly from the horizontal, a belt contacting a part of the perforated portion of the outer surface of the drum from a point near the underside of the drum to a point peripherally spaced above the bottom of the drum; means for delivering unstemmed cherries and clusters of cherries into the drum interior where the arms will engage with cherry clusters and lift them as the drum rotates; a brush mounted within the drum and contacting that portion of the drum interior that is lifting the cherry clusters; means for rotating the brush in a direction opposite to the rotation of the drum; whereby the brush will strike the cherry bodies and will break up the cherry clusters being lifted by the arms; the declustered cherries falling to the drum bottom and the stems of the declustered cherries passing into and extending through the slots of the drum unobstructed by the belt; the stems of the cherries extending through the drum slots adapted to be gripped between the belt and the adjacent outer surface of the drum; the said brush being located opposite the portion of the drum upon which the belt is in contact; whereby the rotating brush will again contact with the cherry bodies to separate the cherries from the belt gripped stems, and a brush for cleaning the surface of the belt that has been contacting the drum, for removing any stems that might adhere thereto.

5. In a device of the type described: a hollow perforated drum having a plurality of inwardly extending cherry stem cluster engaging arms; means for rotating the drum about an axis inclined downwardly slightly from the horizontal, a belt contacting a part of the perforated portion of the outer surface of the drum from a point near the underside of the drum to a point peripherally spaced above the bottom of the drum; means for delivering unstemmed cherries and clusters of cherries into the drum interior where the arms will engage with cherry clusters and lift them as the drum rotates; a brush mounted within the drum and contacting that portion of the drum interior that is lifting the cherry clusters; means for rotating the brush in a direction opposite to the rotation of the drum; whereby the brush will strike the cherry bodies and will break up the cherry clusters being lifted by the arms; the declustered cherries falling to the drum bottom and the stems of the declustered cherries passing into and extending through the slots of the drum unobstructed by the belt; the stems of the cherries extending through the drum slots adapted to be gripped between the belt and the adjacent outer surface of the drum; the said brush being located opposite the portion of the drum upon which the belt is in contact; whereby the rotating brush will again contact with the cherry bodies to separate the cherries from the belt gripped stems, a brush for cleaning the surface of the belt that has been contacting the drum, for removing any stems that might adhere thereto, and a third brush contacting with the outer surface of the underside of the drum at a point just prior to that at which the belt contacts the drum, whereby any stems extending to the outer drum surface will be moved into a position against the drum exterior to be gripped by the belt.

6. In a device of the type described: a hollow perforated drum having a plurality of inwardly extending cherry stem cluster engaging arms; means for rotating the drum about an axis inclined downwardly slightly from the horizontal, a belt contacting a part of the perforated portion of the outer surface of the drum from a point near the underside of the drum to a point peripherally spaced above the bottom of the drum; means for delivering unstemmed cherries and clusters of cherries into the drum interior where the arms will engage with cherry clusters and lift them as the drum rotates; a brush mounted within the drum and contacting that portion of the drum interior that is lifting the cherry clusters; means for rotating the brush in a direction opposite to the rotation of the drum; whereby the brush will strike the cherry bodies and will break up the cherry clusters being lifted by the arms; the declustered cherries falling to the drum bottom and the stems of the declustered cherries passing into and extending through the slots of the drum unobstructed by the belt; the stems of the cherries extending through the drum slots adapted to be gripped between the belt and the adjacent outer surface of the drum; the said brush being located opposite the portion of the drum upon which the belt is in contact; whereby the rotating brush will again contact with the cherry bodies to separate the cherries from the belt gripped stems, and a brush contacting with the outer surface of the underside of the drum at a point just prior to that at which the belt contacts the drum, whereby any stems extending to the outer drum surface will be moved into a position against the drum exterior to be gripped by the belt.

References Cited in the file of this patent

UNITED STATES PATENTS

| Number | Name | Date |
|---|---|---|
| 1,409,803 | Urschel | Mar. 14, 1922 |
| 2,358,500 | Frova | Sept. 19, 1944 |
| 2,462,682 | Schubert | Feb. 22, 1949 |

FOREIGN PATENTS

| Number | Country | Date |
|---|---|---|
| 446,505 | France | Dec. 7, 1912 |
| 266,397 | Italy | July 28, 1929 |